United States Patent

Economu

[15] 3,643,198
[45] Feb. 15, 1972

[54] LINEAR DISPLACEMENT TRANSDUCER SYSTEM

[72] Inventor: Merle A. Economu, 37605 Fifth St. E., Palmdale, Calif. 93550

[22] Filed: Feb. 8, 1971

[21] Appl. No.: 113,377

[52] U.S. Cl............................................338/162, 324/176
[51] Int. Cl.........................................................H01c 9/02
[58] Field of Search.....................338/79, 162; 324/162, 176; 336/15

[56] References Cited

FOREIGN PATENTS OR APPLICATIONS 1,196,719   7/1970   Great Britain..........................338/162

*Primary Examiner*—Laramie E. Askin
*Assistant Examiner*—Gerald P. Tolin
*Attorney*—Finkelstein & Mueth

[57] ABSTRACT

A linear displacement transducer system in which a tension cable is attached to the object of which the relative displacement is to be measured and to the shaft of a shaft angle position transducer (SAPT) such that displacement of the object relative to the shaft results in rotation of the shaft. This displacement provides a measurable variation of the electrical characteristics of the transducer. A cylindrical housing containing the transducer is also provided together with a bracket having a circular opening for accommodating the cylindrical housing to permit positioning of the transducer housing in any orientation with respect to the object.

8 Claims, 2 Drawing Figures

PATENTED FEB 15 1972

3,643,198

INVENTOR
MERLE A. ECONOMU

BY
Finkelstein & Mueth
ATTORNEYS 3,643,198

LINEAR DISPLACEMENT TRANSDUCER SYSTEM

BACKGROUND OF THE INVENTION

1. Field of the Invention the present invention relates to displacement measuring devices and more particularly, to a variable position linear displacement transducer system.

2. Description of the Prior Art

In many applications it is desirable to measure the displacement of objects relative to a body and to provide an electrical signal proportional to the displacement. Such applications are primarily those in which it is difficult, or impossible, to provide a direct physical measurement of the displacement. One such application is in remotely controlled model aircraft. In this application the controller who is on the ground physically remote from the small model aircraft, should be provided with information such as wing flap position and rudder position in order to guide and correct the course of the model aircraft. To accomplish this, wires are generally attached to the rudders and wing flaps and coiled about the shafts of potentiometers. As the rudder or wing flap changes position the shaft of a potentiometer is rotated. Rotation of the shaft of the potentiometer results in a variation in the electrical resistance between the wiper terminal and ends of the particular potentiometer.

This variation in the resistance is representative of the displacement of the flap and is normally used to modulate a transmitter output signal. The transmitter output signal is received on the ground where it is demodulated to provide an indication of the position of the wing flaps.

In full scale, conventional aircraft, linear displacement transducers serve a similar purpose. In this case the variation in resistance between the wiper terminal and ends of a potentiometer resulting from changes in the rudder or wing flap positions is normally coupled directly to indicating instruments in the cockpit. These instruments provide the pilot with an indication of the position of the wind flaps and the rudders. In the case of variable swept wing aircraft, the positions of the wings themselves is provided to the pilot by such means.

Another application involves computer controlled monitoring systems found in automated manufacturing and testing facilities. In these applications, the positions of various objects is monitored by the computer and either stored as data or used on a real time basis for the initiation of further controls. For instance, in a lumbering operation it may be desirable to cut various distances into pieces of lumber. By attaching a tension cable from a linear displacement transducer to the arm of the saw blade, the relative position of the saw blade can be transmitted or communicated back to the computer. In this way, the distance of a cut can be detected and controlled by the computer. Numerous other automated control and processing systems employ similar linear displacement transducers.

In addition to utilizing a potentiometer as the transducer, many other transducers may be employed, such as synchros, resolvers and analog to digital shaft encoders.

A prime consideration in using displacement transducer systems is the positioning of the shaft angle position transducer. In most cases, the transducer must be mounted on a body from which the displacement of the object is to be measured. The body acts as the frame of reference for the measurement of displacement of the object relative thereto. It is desirable to mount the transducer so that the tension cable is pulled out of the transducer housing along a line from the transducer shaft to the opening in the housing through which the cable extends. If the cable is attached at any point other than along this line, the cable must bend as it comes out of the housing causing the cable to scrape the housing. This produces two undesirable effects. The first is that the cable can become snagged or frayed and worn out rubbing against the housing. The second is that a frictional load is imposed on the object for which the displacement is to be indicated and can thus, effect the operation of the system to be monitored. Therefore, it is highly desirable that the position of the transducer be such that the cable can be attached to the object of which the displacement is to be indicated at a point along the line from the transducer shaft through the opening in the transducer housing through which the tension cable passes.

In many applications the physical structure of the mounting body and the direction of movement of the object prohibits mounting the linear displacement transducer directly on the body so as to achieve the desired tension cable alignment. Most prior art systems overcome this problem by building a mounting base for the transducer consisting of wedges or slanting surfaces so as to position the potentiometer in the desired position. If a new position for attachment to the measured object is chosen, then a new base must be constructed for the transducer mounting.

It is therefore desirable to provide a linear displacement transducer system in which the transducer can be readily and flexibly mounted directly on a body yet is capable of being arranged in a wide variety of positions.

SUMMARY OF THE INVENTION

In accordance with the present invention, a linear displacement transducer system is provided which overcomes the above-noted difficulties. The system includes a cylindrical housing containing a shaft angle position transducer and its shaft and a bracket having a circular opening to accommodate the cylindrical housing with clamping means to hold the cylindrical housing in a fixed position within the bracket and to permit movement of the housing to other desired positions.

It is an object of this invention to provide a linear displacement transducer system in which the transducer position can be readily varied to any desired position.

Another object of this invention is to provide a linear displacement transducer system in which the transducer can be readily mounted upon a body having any attitude with respect to the object of which the relative displacement is to be indicated while permitting the tension cable to be attached along a line extending from the transducer shaft through the opening in the transducer housing for the tension cable.

Still other objects, features and attendant advantages of the invention will become apparent to those skilled in the art from a reading of the following of a preferred embodiment.

BRIEF DESCRIPTION OF THE DRAWINGS

Embodiments of the invention are disclosed more fully in the following detailed description taken together with the accompanying drawings wherein similar reference characters refer to similar elements throughout and in which.

DESCRIPTION OF THE PREFERRED EMBODIMENTS

Figure 1:
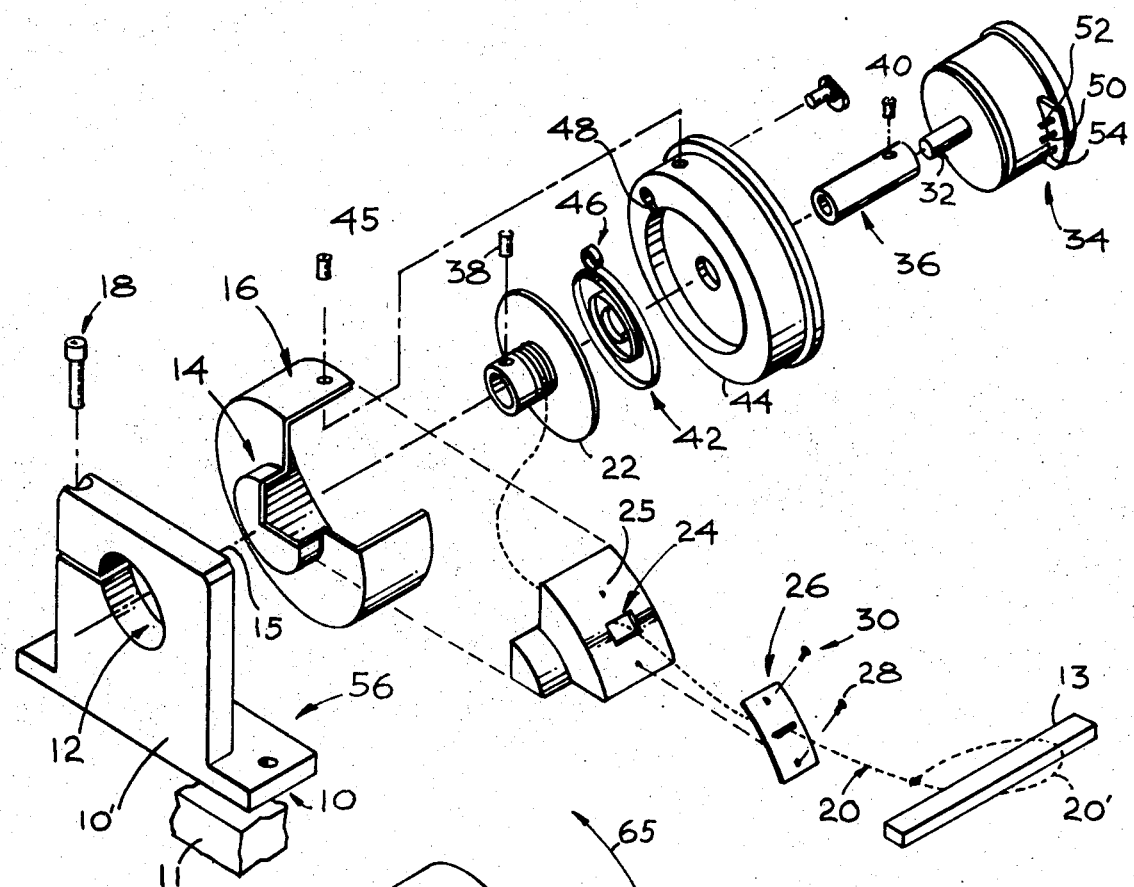
FIG. 1 is an exploded view, showing an embodiment of the linear displacement transducer system and the elements thereof.

Referring now to FIG. 1, there is shown an embodiment of the linear displacement transducer system constructed in accordance with the principles of the invention. Mounting bracket 10 is mounted directly on a body 11. The displacement of the object 13 is to be measured relative to the body 11. Circular opening 12 in mounting bracket 10 accommodates the cylindrical portion 14 of transducer housing 16. Housing locking screw 18 provides the means for clamping the cylindrical section 14 within circular opening 12 of housing 10.

One end of a tension cable 20 is attached to the object 13. The other end of cable 20 is attached to pulley 22. Tension cable 20 extends through opening 24 in the peripheral wall 25 of transducer housing 16. Cable guide plate 26 is attached to wall 25 of housing 16 by means of cable guide mounting screws 28 and 30. Pulley 22 is coupled to shaft 32 of shaft angle position transducer 34 by means of coupler 36. Coupler 36 is inserted in pulley 22 and connected by means of locking screw 38. Coupler 36 is affixed to transducer shaft 32 by means of coupler locking pin 40. Tension spring 42 is mounted in cover plate 44 with coiled end 46 positioned within slot 48 of cover plate 44. The other end of tension spring 42 is affixed to coupler 36. Cover plate 44 is attached to housing 16 by means of cover locking screw 45. Electrical connections are provided as required by the particular transducer. In the present embodiment, transducer 34 is a potentiometer with electrical connections to wiper terminal 50 and ends 52 and 54 of transducer 34. Numerous other shaft angle position transducers such as synchros, resolvers, and analog to digital shaft encoders could be effectively used in place of a potentiometer. In some applications a purely mechanical transducer for converting linear motion to rotational could be employed.

In operation, the displacement of the end 20' of tension cable 20 attached to the object 13 for which the displacement relative to body 11 is to be indicated causes pulley 22 to rotate. Rotation of pulley 22 drivingly rotates by means of coupler 36, shaft 32 of transducer 34. The rotation of shaft 32 of transducer 34 causes a variation in the electrical resistance between wiper terminal 50 and ends 52 and 54 of transducer 34 and thus, in the electrical output of transducer 34. It is this variation in electrical output which provides an indication of the displacement of the tension cable and thus, the displacement of the object 13 relative to body 11. As the object 13 is displaced away from transducer 34 the tension is increased on tension spring 42 so that if the object 13 returns to a position closer to transducer 34 the spring causes pulley 22 to rotate coiling in the slack on tension cable 20 and coupling this motion to shaft 32.

By unscrewing housing locking screw 18 housing 16 can be rotated 360° about an axis 15 through the center of circular opening 12. This permits varying the angle of tension cable 20 through 360° with respect to this axis in a plane parallel to the vertical wall 10' of mounting bracket 10. Thus, the linear displacement transducer system disclosed in this embodiment can be mounted on the body 11 and tension cable 20 can be connected to the object 13 for which the relative displacement is to be indicated, in any position in a plane parallel to the wall 10' of the transducer mounted bracket 10.

Figure 2:
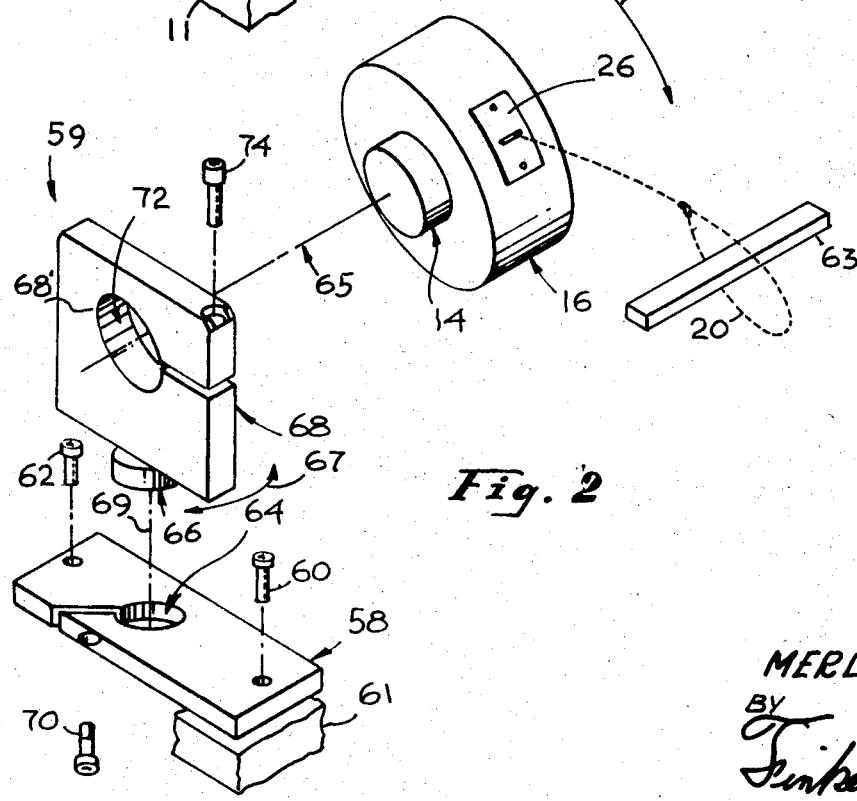
FIG. 2 is a perspective view of another embodiment of the linear displacement transducer system showing the housing and the associated mounting bracket.

Referring now to FIG. 2, there is shown another embodiment of the invention permitting positioning of the tension cable 360° about two separate axes. In this embodiment, base 58 of mounting bracket 59 is attached to a body 61 by means of mounting screws 60 and 62. Circular opening 64 is adapted to receive the cylindrical portion 66 of section 68 of mounting bracket 59. Locking screw 70 serves to clamp cylindrical portion 66 within circular opening 64 by decreasing the circumference of circular opening 64. Circular opening 72 of section 68 is adapted to receive cylindrical section 14 of housing 16. Locking screw 74 serves to clamp cylindrical section 14 within circular opening 72 by reducing the circumference of circular opening 72. Tension cable 20 passes through housing 16 guided by cable guide 26.

In operation, housing 16, and thus tension cable 20, can be rotated 360° in a plane parallel to the wall 68' of section 68 and about the axis 65 through circular opening 72 in directions indicated by double-ended arrow 65. Once the desired position is achieved, locking screw 74 secures housing 16 in this position. Tension cable 20 can be positioned at any position in a plane perpendicular to wall 68' of section 68 by rotating cylindrical section 66 of vertical section 68 within circular opening 64 of base 58 about axis 69 through opening 64 in the direction indicated by double ended arrow 67. Once the desired position is obtained, locking screw 70 may be tightened to secure vertical section 68 in this position. Thus, tension able 20 can be positioned in any position about two axes, 65 and 69 perpendicular to each other. Thus, full flexibility is provided to allow positionings in any angular relationship with respect to base 58. Using the embodiment shown in FIG. 2 the linear displacement transducer can be directly mounted on the body 61 while the housing 16 can be positioned such that the tension cable will be withdrawn along the line from the pulley shaft through the opening for the tension cable in the wall of housing 16 for the object 63 in any direction from the body.

While the present embodiment has been disclosed with the transducer housing having cylindrical portions with smooth surfaces, numerous variations will become apparent to one skilled in the art from this disclosure. For example, the cylindrical portion could contain a series of teeth or slots with corresponding teeth or slots within the circular openings in the bracket so as to permit varying the position without the use of locking screws. In addition- ball-type elements could be substituted for the cylindrical elements on the transducer housing. In this case a corresponding socket would be employed in the mounting bracket to accommodate the transducer housing. These are but some of the numerous variations that will become apparent from a reading of this disclosure.

I claim:

1. A linear displacement transducer system for mounting on a body to provide an indication of the displacement of an object relative to the body and the transducer, comprising, in combination:

a linear displacement transducer having a shaft and an output signal appearing at an output, having the value of the output signal a function of the angular position of the shaft;

a tension cable having first and second ends, having the first end for attachment to the object of which the displacement is to be indicated, and having the second end wound about the shaft of the transducer such that the displacement of the object results in the rotation of the shaft of the transducer and a variation in the output signal of the transducer;

a housing containing the transducer and shaft;

a bracket having a base adapted for mounting on the body;

clamping means attached to the bracket and the housing holding the housing and permitting the positioning of the housing in preselected orientations with respect to the base.

2. The apparatus of claim 1 wherein:

the housing is a substantially cylindrical housing;

the bracket includes a section connected to the base having a substantially circular opening to accommodate the cylindrical housing; and the clamping means includes a first locking element connected to the section to hold the cylindrical housing in a fixed position within the section and to permit movement of the housing to other desired positions.

3. The apparatus of claim 2 wherein the cylindrical housing contains an opening for the tension cable, and said tension cable extending through said opening.

4. The apparatus of claim 2 wherein the clamping means includes a second locking element connected to the base and to the section to hold the section in a fixed position with respect to the bracket and to permit movement of the section to other desired positions.

5. The apparatus of claim 4 wherein:

the section includes a substantially cylindrical portion;

the base includes a substantially cylindrical opening to accommodate the cylindrical portion; and the second locking element is positioned to hold the cylindrical portion of the section in a fixed position within the base and to permit movement of the section to other desired positions.

6. The apparatus of claim 2 wherein the first locking element includes a locking screw adapted to vary the effective circumference of the substantially circular opening in the section so as to hold the cylindrical housing and permit movement of the housing to other desired positions.

7. The apparatus of claim 5 wherein:

the first locking element includes a locking screw adapted to vary the effective circumference of the substantially circular opening in the section so as to hold the cylindrical housing and permit movement of the housing to other desired positions; and the second locking element includes a locking screw adapted to vary the effective circumference of the substantially circular opening in the base in order to hold the cylindrical portion of the section and to permit movement of the section to other desired positions.

8. The apparatus of claim 2 wherein the transducer is a potentiometer.

* * * * *